United States Patent [19]

Hiersig

[11] 4,353,269

[45] Oct. 12, 1982

[54] SHIP'S TRANSMISSION WITH CHANGEOVER FROM CRUISING SPEED TO SLOW SPEED

[75] Inventor: Heinz M. Hiersig, Dusseldorf, Fed. Rep. of Germany

[73] Assignee: Mannesmann Aktiengesellschaft, Dusseldorf, Fed. Rep. of Germany

[21] Appl. No.: 134,003

[22] Filed: Mar. 26, 1980

[30] Foreign Application Priority Data

Mar. 30, 1979 [DE] Fed. Rep. of Germany ....... 2913375

[51] Int. Cl.³ ...................... F16H 37/06; F16H 47/04
[52] U.S. Cl. ........................................ 74/682; 74/687
[58] Field of Search ................ 74/674, 687, 682, 677, 74/681

[56] References Cited

U.S. PATENT DOCUMENTS

| | | | |
|---|---|---|---|
| 2,768,537 | 10/1956 | Seybold | 74/677 |
| 3,455,183 | 7/1969 | Orshansky, Jr. | 74/687 |
| 3,470,769 | 10/1969 | Livezey | 74/687 X |
| 3,665,788 | 5/1972 | Nyman | 74/687 X |
| 3,979,972 | 9/1976 | Sakai | 74/687 |
| 4,184,386 | 1/1980 | Forster | 74/677 |
| 4,191,070 | 3/1980 | McKinniss | 74/682 |

FOREIGN PATENT DOCUMENTS

| | | | |
|---|---|---|---|
| 2655011 | 6/1978 | Fed. Rep. of Germany | 74/687 |
| 1162937 | 9/1958 | France | 74/682 |
| 910653 | 11/1962 | United Kingdom | 74/687 |
| 564479 | 8/1977 | U.S.S.R. | 74/687 |

Primary Examiner—Leslie Braun
Attorney, Agent, or Firm—Cullen, Sloman, Cantor, Grauer, Scott & Rutherford

[57] ABSTRACT

The transmission has a driving shaft (1) and a driven shaft (9) and a changeover coupling, including a primary part (4) connected to the driving shaft and a secondary part (5) connected to an intermediate shaft (6) with a kinematic connection between the intermediate shaft and the driven shaft. The improvement comprises a first planetary gearing (100), including a rotatable stay (11) connected to the secondary part (5). A second planetary gearing (200) includes a rotatable second stay (19) connected to the primary part (4). A hydrostatic pump (28) having fluid fittings (29, 30) and a drive shaft (27) connected to the second planetary gearing (200). A hydrostatic motor (31) having fluid fittings connected to the pump fittings and a motor shaft (32) connected to the first planetary gearing (100), whereby at normal cruising speeds, the primary and secondary parts of the coupling are directly interconnected, and whereby at slow speeds the primary and secondary parts are disconnected. The primary part (4) through the second and first planetary gears (200, 100), pump (28) and motor (31) driving the coupling secondary part (5) connected to the driven shaft (9) at proportionately reduced speeds.

2 Claims, 1 Drawing Figure

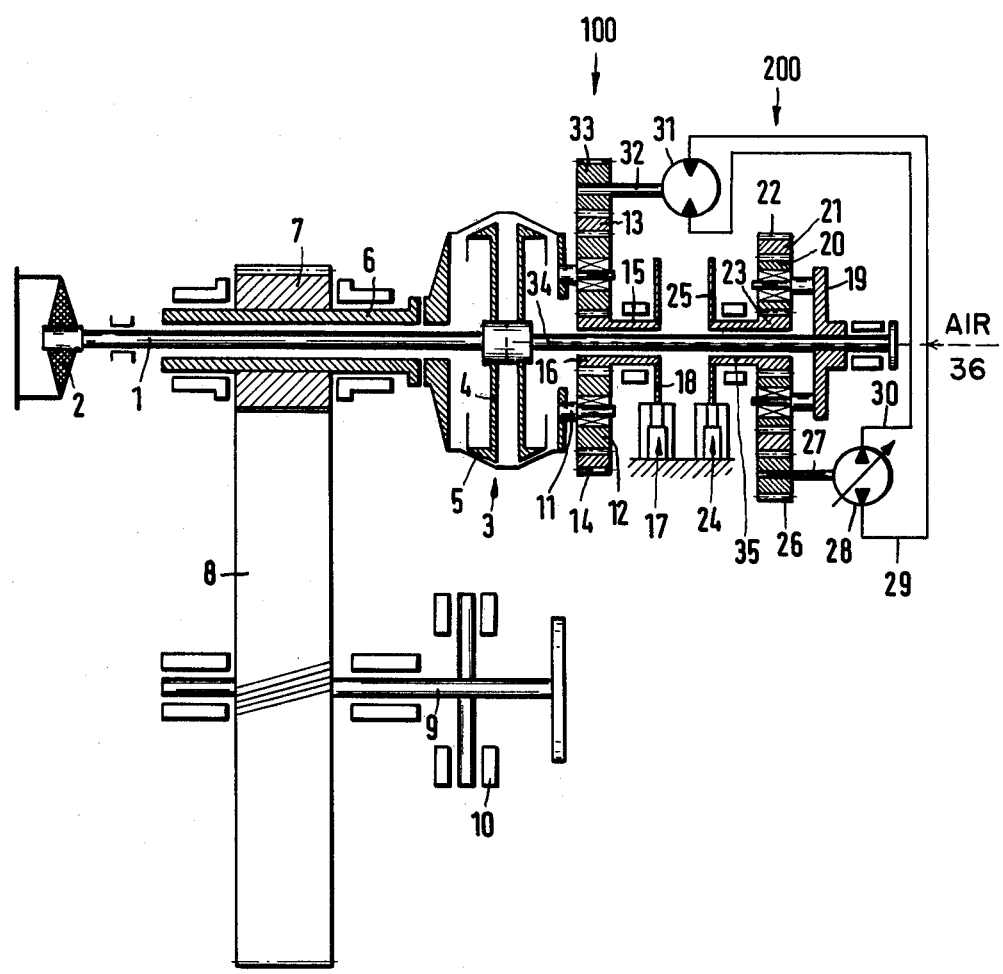

SHIP'S TRANSMISSION WITH CHANGEOVER FROM CRUISING SPEED TO SLOW SPEED

BACKGROUND OF THE INVENTION

Invention relates to a ship's transmission with changeover from cruising speed to slow speed, with a driving shaft and a driven shaft, a changeover coupling being fitted in the kinematic connection of the driving shaft to the driven shaft and having its primary part connected to the driving shaft and its secondary part connected to an intermediate shaft.

The ship's drive equipments which include a diesel engine, gearing, shafting and propeller, make it difficult to travel slower than a speed corresponding to the lowest speed of rotation of the engine, when a fixed propeller is used. In certain cases, however, extremely slow travel or a correspondingly slow speed of rotation of the propeller, must be insured.

SUMMARY OF THE INVENTION

The object of the invention is to develop the ship's transmission of the stated type such that extremely slow travel is possible while the engine's minimum speed of rotation is maintained.

Thus, according to the invention, it is proposed to configure a ship's drive so as to include a first planetary gearing (100), including a rotatable stay (11) which is connected to the secondary part (5) of the changeover transmission. A secondary planetary gearing (200) includes a rotatable second stay (19) connected to the primary part (4) of the changeover coupling. A controllable variable delivery hydrostatic pump (28) having fluid fittings (29, 30) and a drive shaft (27) connected to said secondary planetary gearing. A hydrostatic motor (31) has fluid fittings (29, 30) connected to the fittings of the hydrostatic pump and a motor shaft (32) which is connected to the first planetary gearing, whereby at normal cruising speeds the primary and secondary parts of the coupling are directly interconnected, and whereby at slow speed the primary and secondary parts are disconnected. The primary part (4) through the second and first planetary gearings (200, 100), the pump (28) and the motor (31) drive the coupling secondary part (5) connected driven shaft (9) at proportionally reduced speeds.

A further embodiment of the invention includes in the kinematic connection a hollow shaft (6) journalled over and receiving the drive shaft (1) and connected to the secondary part (5) of the coupling (3). A large gear wheel (8) is secured upon the driven shaft (9) and an intermediate gear wheel (7) is secured to the hollow shaft (6) and is in mesh with the large gear wheel (8), and wherein the driving shaft is connected to the coupling primary part (4), and wherein the primary and secondary parts (4, 5) of said coupling are interconnected.

A further improvement includes a tubular shaft 34 which extends into the coupling and is axially connected to the drive shaft (1) and to the coupling primary part (4). The sun wheels (16, 23) include spaced aligned hollow tubes (15, 35) guidably receiving the tubular shaft (34), said tubular shaft being connected to and rotates the second stay (19) of the secondary planetary gearing (200). A pair of spaced brake discs (18 and 25) are arranged between the first and second planetary gears (100, 200) and are mounted upon the tubes (15, 35) and respectively extend to first and second brakes (17, 24).

Thus, according to the invention the drive shaft, connected to the engine via a highly elastic coupling, is either connected, by means of the changeover coupling, to the main transmission and hence to the propeller shaft, or the planetary shaft transmission containing the two planetary gearings is interposed with the hydrostatic adjustment pump. This occurs when the diesel engine has reached its minimum speed of rotation. In this way it is possible to allow the propeller to run very slowly and to reduce the rate of rotation down to stopping of the propeller.

THE DRAWING

The attached drawing shows schematically an embodiment of the invention.

DESCRIPTION OF AN EMBODIMENT OF THE INVENTION

The ship's transmission shown, which can be changed over from cruising speed to slow speed, contains a suitably journalled drive shaft 1 which is to be connected via a highly elastic shaft coupling 2 to a diesel engine, not shown. The drive shaft is connected to the primary part 4 of a changeover coupling 3, to the secondary part 5 of which is connected a suitably journalled hollow shaft 6. Said shaft carries an intermediate gear wheel 7 that is in mesh with a large gear wheel 8 on the driven shaft 9 of the transmission. The driven shaft 9 mounting a propeller, not shown, is secured against axial thrust by means of axial thrust bearings 10 to take up the propeller thrust. With the changeover coupling 3 interposed, i.e., at cruising speed and also even at reduced cruising speed, the transmission of the torque takes place via the above-mentioned parts 1–9.

The primary part 4 of the changeover coupling 3 is further connected to a shaft 34, which is passed through lengths 15, 35 of hollow shaft of two planetary gearings 100, 200. Planetary gearing 200 is connected at its right-hand external end for positive rotation with a planetary stay 19 forming a part of the second planetary gearing.

The first planetary gearing 100 is connected to the secondary part 5 of the changeover coupling 3, the connection being made via the planetary stay 11 of the first planetary gearing. The planetary stay 11 carries planet wheels 12 which mesh with an internally toothed wheel 13. The internally toothed wheel 13 has an external toothing 14. The length 15 of hollow shaft associated with the first planetary gearing 100 carries on the one side a sun wheel 16 and on the other side brake disks 18 of a brake 17.

As well as the planetary stay 19, there also belong to the planetary gearing 200, planet wheels 20, an internally toothed wheel 21 with an external toothing 22, and a sun wheel 23 on the length 35 of hollow shaft, which further carries a brake disk 25 of the second brake 24.

The internally toothed wheel 21, via its external toothing 22, drives a pinion 26 on the drive shaft 27 of a hydrostatic adjusting pump 28, which is connected via corresponding pressure ducts 29, 30 to a hydrostatic motor 31. The motor shaft 32 of the hydrostatic pump 31 carries a pinion 33 which is in mesh with the external toothing 14 of the first planetary gearing 100.

When, on reaching the minimum rate of rotation of the diesel engine, the changeover coupling 3 is disengaged and the second brake 24 of the second planetary gearing is engaged and holds the sun wheel 23 fast. The hydrostatic adjustment pump 28, swung out at this instant, applies its full displacement volume and thus drives the hydrostatic motor 31 at a relatively high speed. The individual transmission elements of the transmission are, or can be, mutually matched such that on changing over the ship's transmission, i.e., on disengaging the changeover coupling 3, a stepless transition occurs as regards rate of rotation.

For slow travel, besides the brake 24, the brake 17 is also engaged and holds the sun wheel 16 of the first planetary gearing 100 fast. Thus, the torque transmitted from the motor 31 via the pinion 33 to the internally toothed wheel 13 is transmitted, at a corresponding gear ratio, to the planetary stay 11. The planetary stay 11 now drives the secondary part 5 of the changeover coupling, the hollow shaft 6 and finally the driven shaft 9. By reduction of the delivery volume of the hydrostatic pump 28 by pivoting this pump back it is possible to reduce the rate of rotation of the hydrostatic motor 31 and hence that of the driven shaft 9, with control down to a standstill.

Vice versa, the rate of rotation of the driven shaft 9 can also be gradually increased from zero until the changeover rotation speed of the driven shaft 9 is reached, whereupon the brakes 17 and 24 are released and the changeover coupling 3 is engaged. The hydrostatic pump 28 is brought to the zero setting and, together with the hydrostatic motor, holds the internally toothed wheels 21 and 13 fast.

A double cone frictional coupling is advantageously utilized as the changeover coupling 3, as is made clear in the drawing. The compressed air required for changing over the changeover coupling 3 can be supplied at 36 through the hollow shaft 34 from its free shaft end into said coupling.

Having described my invention, reference should now be had to the following claims.

I claim:

1. In a ship's transmission with changeover from cruising speed to slow speed, having a driving shaft (1), a hollow intermediate shaft (6) and a driven shaft (9), and a kinematic connection between said driving and driven shafts, a changeover coupling in said kinematic connection, said coupling including a primary part (4) connected to the driving shaft and a secondary part (5) connected to said intermediate shaft, the improvement comprising:

a first planetary gearing (100), including a rotatable stay (11) connected to said secondary part (5);
a secondary planetary gearing (200) including a rotatable second stay (19) connected to said primary part (4), a controllable variable delivery hydrostatic pump (28) having fluid fittings (29, 30) and a drive shaft (27), a pinion (26) secured upon said drive shaft and connected to said second planetary gearing;
and a hydrostatic motor (31) having fluid fittings (29, 30) connected to said pump fittings, and a motor shaft (32) connected to said first planetary gearing; whereby at normal cruising speeds the primary and secondary parts of said coupling are directly interconnected; and whereby at slower speed, said primary and secondary parts are disconnected;
said primary part (4) through said second and first planetary gearing (200, 100), pump (28) and motor (31) driving said coupling secondary part (5) and connected driven shaft (9) at proportionately reduced speeds;
said first planetary gearing (100), including a sun wheel (16) registerable with a first brake (17), planet wheels (12) journalled upon said stay (11) and in mesh with said sun wheel;
and an internally toothed wheel (13) having outer toothing (14) and surrounding and in mesh with said planet wheels (12);
said second planetary gearing (200) including a second sun wheel (23) registerable with a second brake (24), second planet wheels (20) journalled upon said second stay (19), and in mesh with said secondary sun wheel (23), and a second internally toothed wheel (21) having outer toothing (22) surrounding and in mesh with said second planet wheels (20);
said pinion (26) being in mesh with the external toothing (22) of said second gear wheel (21);
said hydrostatic motor including a gear wheel (33) secured upon said motor shaft (32) and meshing with the external gearing (14) of said first wheel (13);
said kinematic connection including said intermediate shaft (6) journalled over and receiving said drive shaft (1) and connected to said secondary part (5) of said coupling (3);
a large gear wheel (8) secured upon said driven shaft (9), and an intermediate gear wheel (7) secured to said intermediate shaft and in mesh with said large gear wheel (8);
said driving shaft being connected to said coupling primary part (4);
said primary and secondary parts (4, 5) of said coupling being interconnected;
a tubular shaft (34) coaxial to said driving shaft (1) and extending into said coupling (3) and connected at one end to its primary part (4), said sun wheels (16, 23) including a pair of spaced aligned hollow tubes (15, 35) guidably receiving said tubular shaft (34), said tubular shaft being connected to and rotates said second stay (19) of said secondary planetary gearing (200);
and a pair of spaced brake discs (18) between said first and second planetary gears (100, 200) mounted upon said tubes (15, 35) respectively extending into said first and second brakes (17, 24) respectively.

2. In the ship's transmission of claim 1, the delivery of said pump being variably set to proportionately reduce the speed of said motor shaft (32) and driven shaft (9).

* * * * *